United States Patent [19]

Kabayama

[11] Patent Number: 4,597,486
[45] Date of Patent: Jul. 1, 1986

[54] CLUTCH DISC ASSEMBLY WITH BALANCING MEANS

[75] Inventor: Yoshiaki Kabayama, Kadoma, Japan

[73] Assignee: Kabushiki Kaisha Daikin Seisakusho, Osaka, Japan

[21] Appl. No.: 639,080

[22] Filed: Aug. 9, 1984

[30] Foreign Application Priority Data

Aug. 9, 1983 [JP] Japan .............................. 58-124168[U]

[51] Int. Cl.⁴ .............................................. F16D 13/68
[52] U.S. Cl. ................... 192/107 R; 192/70.14; 188/218 XL
[58] Field of Search .......... 192/107 R, 107 M, 107 C, 192/70.14; 74/573 R; 188/218 A, 218 XL

[56] References Cited

U.S. PATENT DOCUMENTS

| 3,446,323 | 5/1969 | Hilpert | 192/107 R |
| 3,543,901 | 12/1970 | Plankstadt et al. | 192/107 R |
| 3,684,070 | 8/1972 | Maucher | 192/107 C |
| 4,199,044 | 4/1980 | Ivens et al. | 192/107 R |
| 4,220,055 | 9/1980 | Dubois et al. | 74/573 R |
| 4,291,786 | 9/1981 | Ito | 74/573 R |

FOREIGN PATENT DOCUMENTS 2103733 2/1983 United Kingdom ............ 192/107 R

Primary Examiner—George H. Krizmanich
Attorney, Agent, or Firm—Burns, Doane, Swecker & Mathis

[57] ABSTRACT

A clutch disc assembly with a balancing device includes a disc adapted to be connected to an output shaft; a supporting plate device provided at the outer peripheral portion of the disc; a pair of friction facings fixed to both surfaces of the plate device; and a rivet for correcting an unbalance of an inertial mass of the disc assembly around the output shaft and fixed to the plate device. The facing may be provided with a port in which the rivet for correcting the unbalance is disposed, and a friction facing piece is disposed in the port to form a part of a friction surface.

5 Claims, 5 Drawing Figures

CLUTCH DISC ASSEMBLY WITH BALANCING MEANS

BACKGROUND OF THE INVENTION

The present invention relates to a clutch disc assembly suitable for an automobile and other vehicle for an industrial use and an agricultural use.

In a conventional clutch disc, a clutch plate connected to a friction facing has a slightly larger diameter than a retaining plate and a flange of an output hub connected to an output shaft, and rivets are fixed to the radially outer portion of the clutch plate which protrudes radially beyond the outer peripheries of the retaining plate and the hub flange. Said rivets are provided for correcting unbalance of an inertial mass and a moment of inertia of the disc around the output shaft.

However, the clutch discs have been required to be small in sizes and weight. And, if the diameter of the clutch plate is reduced to satisfy the above, it becomes difficult to provide at the outer peripheral portion with a space to which the rivets for correcting the unbalance are fixed. Further, if the diameter of the clutch plate is reduced, the outer peripheral portion of the clutch plate axially overlaps to the outer peripheral portions of the hub and the retaining plate. In this case, if the rivets for correcting the unbalance are fixed to the outer peripheral portion of the clutch plate, the rivets may contact the outer peripheral portion of the hub flange. Moreover, if the diameter of the clutch plate is reduced, a distance or a radius between the outer peripheral portion of the clutch plate and the output shaft is also reduced. Therefore, the rivets fixed to the outer peripheral portion should be heavy for correcting the unbalance, which increases the weight of the disc.

Accordingly, it is an object of the invention to provide an improved disc assembly, overcoming the above-noted disadvantages.

The essence of the invention is to fix a balancer rivet to a plate disposed at a radially outer portion of a disc for supporting a friction facing.

Other and further objects, features and advantages of the invention will appear more fully from the following description of the preferred embodiments of the invention.

DETAILED DESCRIPTION OF THE PREFERRED EMBODIMENTS

Figure 1:
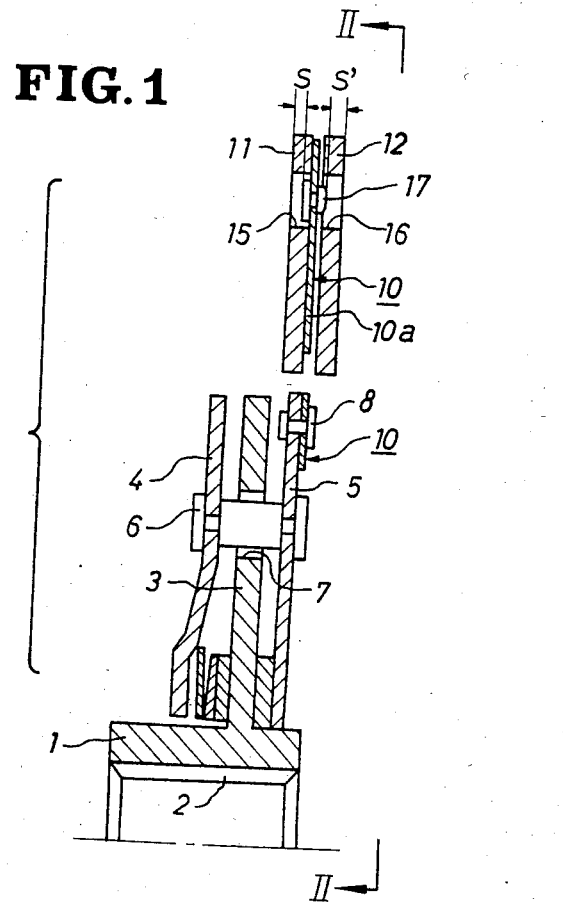
FIG. 1 is a schematic sectional partial view of a clutch disc assembly of an embodiment of the invention.

Referring to FIG. 1, a clutch disc for an automobile is illustrated. A hub 1 is provided with an inner spline teeth 2 which connect to an output shaft (not shown) of the clutch (in other words, an input shaft of a transmission). The spline hub 1 is integrally provided at the outer periphery with an annular hub flange 3. A retaining plate 4 and a clutch plate 5 are disposed at the respective sides of the flange 3 and are rotatably fitted around the hub 1. Both plates 4 and 5 are rigidly fixed together by, e.g., four stop pins 6 (only one is shown) which extend through openings 7 provided in the flange 3. The flange 3 and both plates 4 and 5 have substantially same outer diameters.

Figure 2:
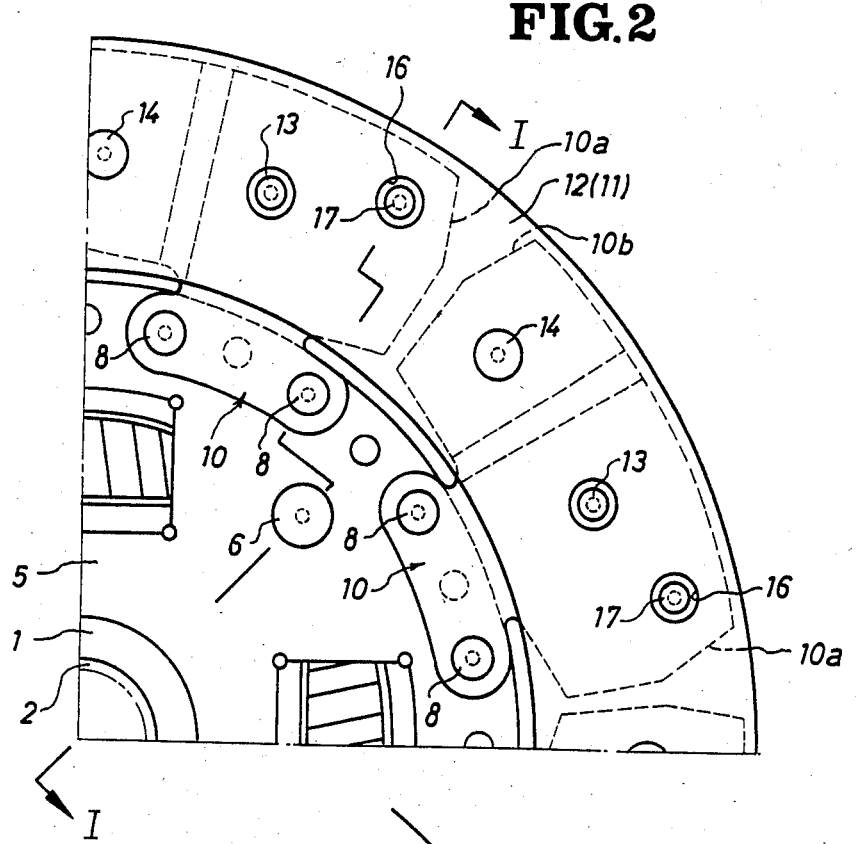
FIG. 2 is a schematic partial front view of the disc assembly in FIG. 1 taken along line II—II in FIG. 1.

Eight cushioning plates 10 are fixed to the radially outer portion of the clutch plate 5 respectively by two rivets 8. A pair of annular friction facings 11 and 12 are fixed to respective surfaces of the cushioning plates 10. As shown in FIG. 2, each cushioning plate 10 is bent at the circumferentially middle portion and is provided with axially shifted portions 10a and 10b with the middle bent portion therebetween. The portion 10b is shifted forwardly (oppositely to the retaining plate 4 in FIG. 1) with respect to the portion 10a. The friction facing 11 is fixed to the rear surfaces of the portions 10a by rivets 13 caulked thereto. The friction facing 12 is fixed to the front surfaces of the portions 10b by rivets 14.

The rivets 13 and 14 are fixed at a substantially middle portion and a portion near one end of each cushioning plate 10 respectively. A rivet 17 is fixed to each portion 10a, and more concretely, to a portion near the other end of each plate 10. The rivet 17 is employed for correcting the unbalance of the inertial mass of the disc around the center thereof which is coaxial to the output shaft. As shown in FIG. 1, the rivet 17 fixes neither of the facings 11 and 12 to the plate 10. The facings 11 and 12 are provided with coaxial ports 15 and 16 in which the rivet 17 is disposed. There are axial distances S and S' between the friction surfaces of the new facings 11 and 12 and both ends of the rivet 17, respectively. The distances S and S' are longer than the allowable lengths of the wear of the facings 11 and 12, respectively.

In the clutch disc, if the inertial mass around the output shaft is unbalanced, the clutch can not engage smoothly, and further, a harmful load is applied to an output shaft supporting the output shaft. However, according to the invention, the rivets 17 correct the unbalance of the inertial mass. Although, in the illustrated embodiment, the rivets 17 are fixed at the same positions in the respective cushioning plates 10, the rivets 17 may be fixed at different positions to keep the best balance. Two or more rivets 17 may be fixed to one cushioning plate 10. The rivets 17 may be fixed to only one or some of the cushioning plates 10. The rivets 17 may have respectively different weights.

Figure 3:
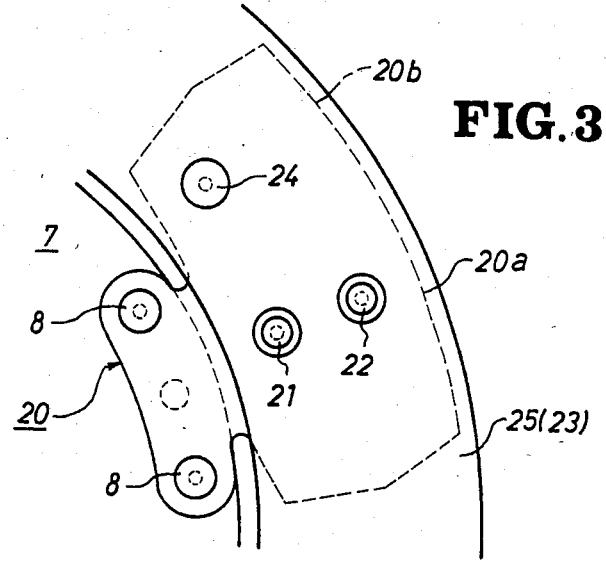
FIG. 3 is a schematic partial front view of a disc assembly of another embodiment of the invention.

Another embodiment will be explained with referring to FIG. 3. In the embodiment in FIG. 3, each cushioning plate 20 is curved into a wave-like shape. A friction facing 23 is fixed to the surface of a portion 20a of each plate 20 by two rivets 21 and 22 which are aligned substantially in a radial direction of the disc. Other facing 25 is fixed by one rivet 24 to a portion 20b of each plate 20 which is shifted forwardly with respect to the portion 20a. The rivets 21 and 24 have hollow structures. The rivets 22 have not hollows and are heavy. In this embodiment, The rivets 22 correct the unbalance of the inertial mass. Further, the facing 23 is fixed to each plate 20 by two rivets 21 and 22, which increases a bursting strength of the facing 23.

Figure 4:
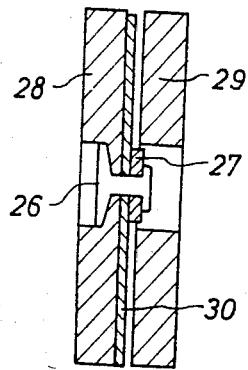
FIG. 4 is a schematic partial sectional view of a disc assembly of still another embodiment of the invention.

In an embodiment in FIG. 4, a facing 28 is fixed to a group of cushioning plates 30 by a plurality of rivets 26. Some of the rivets 26 support and fix ring weights 27 for correcting the unbalance of the inertial mass. In an assembling process, a pair of the facings 28 and 29 are fixed to the cushioning plates 30 by some of the rivets 26 without the weights 27, and the unbalance of the disc is measured. And then, the remaining rivets 26 are fixed to the facings 28 and the plate 30 together with the weights 27.

Figure 5:
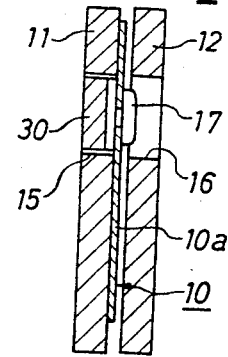
FIG. 5 is a schematic partial sectional view of a disc assembly of still another embodiment of the invention.

An embodiment in FIG. 5 is substantially same as that in FIG. 1 except for friction facing pieces 30 which are same material as the facings 11 and 12. Each facing piece 30 is circular and is fixed to the head of the rivet 17. In this case, the frictional surface can have an large area. The weight of the pieces 30 can be used for correcting the unbalance of the inertial mass.

The invention may be employed in a clutch disc provided with cushioning plates which are less than or more than eight in number or a disc provided with an annular plate for supporting a pair of friction facings. The invention may be employed in a disc in which a clutch plate has a larger diameter than a retaining plate as usual. The invention may be applied to a disc for a single clutch or a dual clutch employed in vehicles for an industrial use and an agricultural use.

According to the invention, as stated hereinbefore, the rivets 17 for correcting the unbalance can be fixed easily, because the cushioning plates 10 have larger spaces for the rivets 17 than the outer peripheral portion of the clutch plate 10, and there is no possibility for the rivets 17 on the plates 10 to contact other members. Further, the light rivets 17 can be used for correcting the unbalance, because the distance from the center of the output shaft to the rivet 17 on the plate 10 is longer than that from the center of the output shaft to the outer peripheral portion of the clutch plate. The light rivets 17 result in such an advantage that whole of the disc can be light.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A clutch disc assembly comprising a disc adapted to be connected to an output shaft; a supporting plate means provided at the outer peripheral portion of the disc; a pair of friction facings fixed to corresponding surfaces of the plate means; each facing having a friction surface and at least one aperture, the apertures of both facings being in axial alignment with one another; and a rivet for correcting an unbalance of an inertial mass of the disc assembly around the output shaft and fixed to the radially outer portion of the plate means through the aperture and recessed from the friction surfaces of the friction facings.

2. A clutch disc assembly of claim 1 wherein said friction facings are fixed to the plate means by additional rivets.

3. A clutch disc assembly of claim 1 wherein one of said friction facings is fixed by the rivet for correcting the unbalance.

4. A clutch disc assembly of claim 1 wherein said rivet for correcting the unbalance fixes a weight for correcting the unbalance to the plate means.

5. A clutch disc assembly of claim 1 wherein a friction facing piece is disposed in the aperture which receives the rivet for correcting unbalance, the friction facing piece forming part of a friction surface.

* * * * *